Jan. 12, 1971  H. E. HELMS  3,554,663
COOLED BLADE

Filed Sept. 25, 1968  2 Sheets-Sheet 1

INVENTOR
Harold E. Helms
BY
Paul Fitzpatrick
ATTORNEY

Jan. 12, 1971

H. E. HELMS 3,554,663

COOLED BLADE

Filed Sept. 25, 1968

INVENTOR.
Harold E. Helms
BY
Paul Fitzpatrick
ATTORNEY

United States Patent Office 3,554,663
Patented Jan. 12, 1971

3,554,663
COOLED BLADE
Harold E. Helms, Indianapolis, Ind., assignor to General Motors Corporation, Detroit, Mich., a corporation of Delaware
Filed Sept. 25, 1968, Ser. No. 762,411
Int. Cl. F01d 5/08
U.S. Cl. 416—90                             4 Claims

ABSTRACT OF THE DISCLOSURE

A transpiration cooled blade for a high temperature turbine has a wall of laminated structure of controlled porosity made up of several layers of thin sheet metal. Inner strengthening layers have grooves or channels for conduction of cooling air into the wall which extend spanwise of the blade and are tapered toward the base of the blade to provide an increase in cross-section and strength of the blade toward the base.

---

The invention herein described was made in the course of work under a contact or subcontract thereunder with the Department of Defense.

My invention is directed to cooled structures for high temperature turbomachines and particularly to improved transpiration cooled rotor blade structures. The invention is particularly directed to transpiration cooled structure having one or more outer layers of controlled permeability to flow of cooling fluid from the inside to the outer surface of the blade laminated with one or more inner layers which conduit the cooling fluid to the outer layers and which act to strengthen the blade structure. According to my invention the blade structure is provided with holes or channels extending primarily spanwise of the airfoil or fluid directing portion of the blade, which holes or channels taper or converge in the direction toward the base of the blade so that the metal structure of the airfoil is stronger toward the base where the centrifugal force is greater and lighter toward the tip.

The principal objects of my invention are to improve the efficiency, economy, and reliability of high temperature turbomachines, to provide improved airfoil members for such machines, to provide improved cooling structure in a blade for high temperature use, and to provide a laminated hollow sheet metal blade structure of improved strength and weight characteristics.

The nature of my invention and the advantages thereof will be clear to those skilled in the art from the succeeding detailed description of the preferred embodiment of the invention and the accompanying drawings thereof.

Before proceeding to the detailed description of the preferred embodiment of the invention, it may be noted that this embodiment includes structure common to or based upon those disclosed in prior United States patent applications, of ownership with this application, as follows: Ser. No. 526,207 of Bratkovich and Meginnis for Laminated Porous Metal, filed Feb. 9, 1966; Ser. No. 707,556 of Helms for Turbine Blade, filed Feb. 23, 1968; Ser. No. 742,900 of Meginnis for Turbine Blade, filed July 5, 1968. The overall structure of the blade in its preferred embodiment is the same as that described in my application No. 707,556, apart from the arrangement of the cooling passages in the airfoil.

Figure 1:
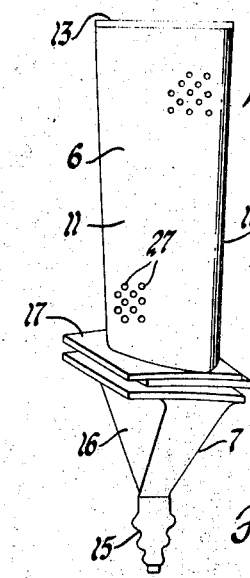
FIG. 1 is an elevation view of a turbine blade embodying the invention, the view being taken in a plane perpendicular to the axis of the blade root.
Figure 2:
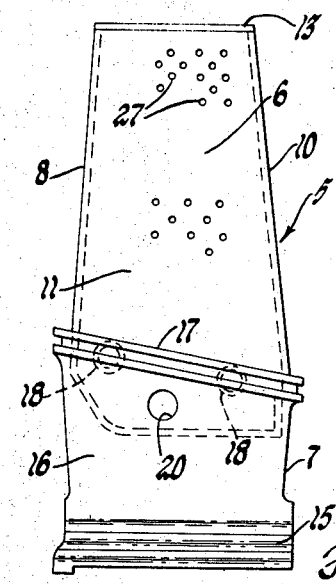
FIG. 2 is a similar view of the blade taken in a plane parallel to the axis of the blade root.
Figure 3:
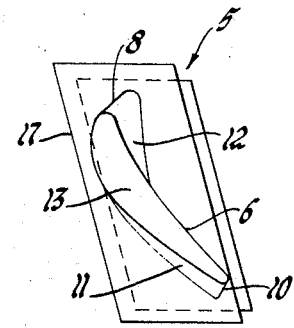
FIG. 3 is a plan or tip end view of the blade.
Figure 4:
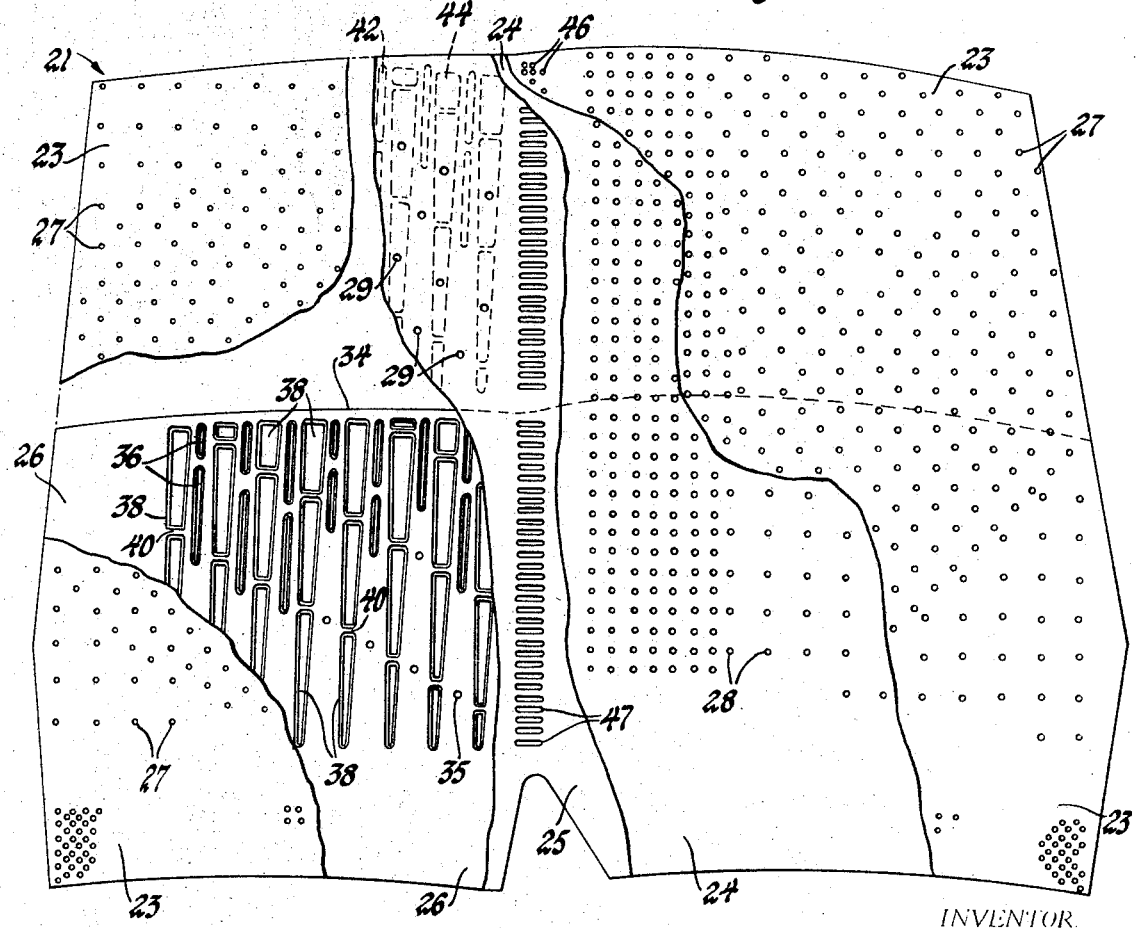
FIG. 4 is a developed view of the wall of the blade with layers cut away in part.
Figure 5:
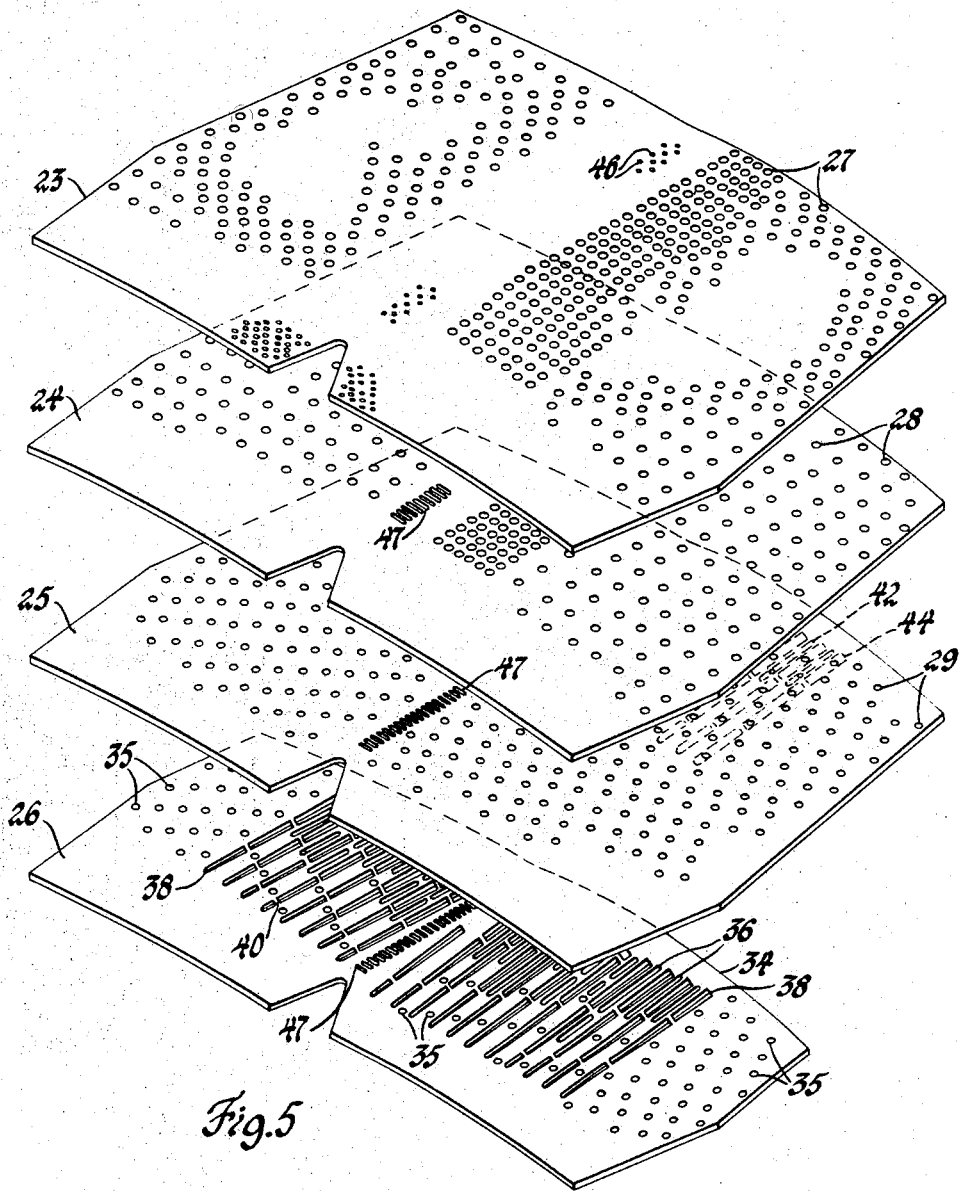
FIG. 5 is a developed view of the laminated structure of the blade wall prior to the bonding together of the several layers.
Figures 6, 7:
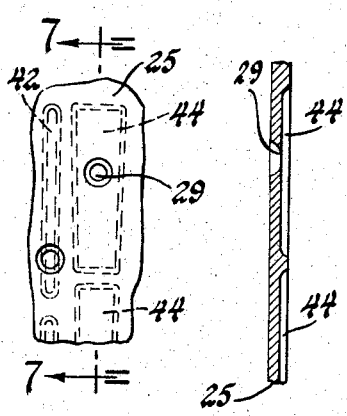
FIG. 6 is an enlarged view of a portion of one layer of the blade wall.
FIG. 7 is a section of the same taken on the plane indicated by the line 7—7 in FIG. 6.
Figures 8, 9:
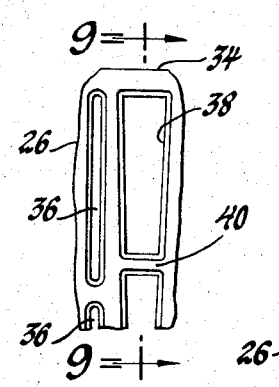
FIG. 8 is an enlarged view of a portion of another layer of the blade wall.
FIG. 9 is a section of the same taken on the plane indicated by the line 9—9 in FIG. 8.

Describing this structure briefly, the turbine rotor blade 5 of FIGS. 1, 2, and 3 comprises an airfoil or fluid directing portion 6 and a base 7 by which it is attached to the turbine rotor. The airfoil is a hollow folded sheet metal structure having a leading edge 8 and a trailing edge 10 connected by a convex or low pressure face 11 and a concave or high pressure face 12. The tip of the blade is closed by a cap 13.

The blade base 7 comprises a dovetail root 15, a stalk 16, and a platform 17. When the blade is mounted on the turbine rotor (not shown), the root engages in a suitable dovetail blade slot in the rotor, the stalk connects the root to the airfoil, and the platforms 17 abut to define a boundary of the motive fluid path through the turbine. The base 7 is cast around the sheet metal airfoil to provide a unitary structure as described in my above-mentioned application, the metal of the base extending through tubes 18 integral with the airfoil. The base defines an air entrance hole 20 to admit cooling air into the interior airfoil from the rotor.

The preferred structure of the fluid directing element or airfoil which is the subject of my present invention is illustrated more particularly in FIGS. 4 to 9. As shown clearly in FIGS. 4 and 5, the airfoil is defined by a sheet metal structure or wall 21 of laminated structure made up of four layers which are, respectively, from the outer surface of the airfoil to the interior, a surface layer 23, an intermediate layer 24, an inner layer 25, and an inside or reinforcing layer 26. All these layers have a surface relief which defines bosses, grooves, and holes in various ones of the layers for the purpose of distributing air through the material of the balde wall which is discharged from the surface of the blade through a large number of small pores to effect transpiration cooling of the blade wall. Such surface relief and hole patterns, except as hereinafter described, may follow the teaching described in the Bratkovich and Meginnis application referred to above, and more specifically that of the above-mentioned Meginnis application. The surface relief may be created by any suitable machining process, but the preferred one is a suitable photoetching process. The several layers are united into a single structure by a suitable bonding process which, with the sort of materials contemplated here, would ordinarily be a process of diffusion bonding. Thus, after the holes bosses, grooves, and such have been photoetched in the individual layers, they are laid up in register and bonded to form a unitary sheet which provides the blade wall. This is thereafter folded at the leading edge, formed to the desired contours, and welded or otherwise joined at the trailing edge, and the metal of the blade base is cast to and united with the airfoil thus provided.

The surface layer 23 has a pattern of small pores 27 distributed over its surface, and the internal layer 24 has a pattern of small pores 28, these being out of register with the pores 27. The inner layer 25 has distributed over its surface pores 29 out of register with the pores 28. The inner surfaces of the layers 23 and 24 are provided with bosses to provide a space between these layers to allow flow within the blade wall from pores 29 to pores 28 to pores 27 and out of the outer surface of the airfoil. The size and distribution of the pores may be as desired to assure the proper distribution of cooling air. The structure of the pores and of the bosses may be as described in the above-mentioned application of Meginnis.

The inside or reinforcing layer 26 may, if desired, extend to the outer end of the airfoil at the cap 13, but it preferably terminates approximately at midspan of the blade at the terminating line 34. The inside layer has a varied pattern of pores or small holes 35, narrow slots 36, and tapering channels 38. These holes, slots, and channels provide for flow of air from the interior of the blade, which it reaches through the hole 20, through the inside layer 26 to the inner layer 25. They also provide a progressive lessening in the cross-sectional area of the inside layer 26 from the base of the airfoil toward the tip. As is clearly apparent in FIG. 4, the channels 38 taper or converge toward the base of the airfoil, and the fingers of metal extending from the base toward the tip of the blade between these channels taper or converge toward the tip of the blade. Thus the strength of the reinforcing layer, and therefore of the airfoil, is greatest toward the base where stresses are greatest, and the elimination of unnecessary cross-sectional area and therefore mass of the blade toward the tip decreases the load on the portion of the airfoil toward the base, as well as the base itself. As clearly shown in FIGS. 4 and 5, the tapered channels 38 are broken by pieces or bridges 40 which extend between the fingers of metal on opposite sides of the channels. These bridges are desirable to control the contour or shape of the thin sheet metal layer 26 and provide dimensional stability before it is bonded to the other layers.

The distribution of the pores 35, slots 36, and channels 38 is such that they provide for delivery of air to the pores in the inner layer 25. This structure of the inside layer may be somewhat clearer from FIGS. 8 and 9, which show, greatly enlarged, a portion of this layer with the channels 38 and slots 36, as well as the bridge 40 crossing the channel 38.

The principle of tapered structure described with respect to the inside layer 26 may also be applied in modified form to the inner layer 25, as shown in the portion of that layer beyond the terminus 34 of the inside layer 26 in FIGS. 4, 5, 6, and 7. Here the layer 25 has a pattern of slots 42 and tapered channels 44 quite similar to the pattern in inside sheet 26, except that these slots and channels are etched into the inner face of the sheet and do not extend entirely through the sheet. The effect of reducing the mass and the strength of the layer and therefore of the airfoil toward the tip is present as in the inside layer 26.

The portion of the surface layer 23 which is radiused to provide the leading edge 8 of the blade has a pattern of small pores 46 which are supplied with cooling air through small slots 47 in the other three layers of the airfoil walls.

It should be apparent to those skilled in the art that my invention provides a blade or airfoil structure which has a desirable preponderance of tensile strength in the spanwise direction where it is needed, and which has a tapering of mass and strength from the base toward the tip, in accordance with the need to attain the mass as light as possible and to proportion the tensile strength to the loads, which are largely centrifugal, although there are also bending loads due to gas loads or vibration of the blade. The pattern of tapering channels may very readily be produced by the photoetching process used to provide the holes for flow of the cooling air and the surface relief to permit flow parallel to the face of the blade between the various layers. The layers, or some layers of the airfoil could be tapered in thickness, as described in the Meginnis application, if desired. The airfoil structure of my invention could be employed in a stationary airfoil or blade such as a turbine nozzle vane, but presumably would not be needed in such a situation.

The detailed description of the preferred embodiment of my invention for the purpose of explaining the principles thereof is not to be considered as limiting or restricting the invention, since many modifications may be made by the exercise of skill in the art.

I claim:

1. A blade for a high temperature turbomachine comprising a hollow fluid-directing airfoil adapted to be cooled by flow of a coolant from the interior to the exterior of the airfoil and a base rigidly connected to the airfoil and adapted to connect the airfoil to a support, the airfoil having a formed laminated sheet metal wall defining airfoil faces and made up of mutually bonded layers of sheet metal, the said layers comprising an outer portion of controlled permeability and one or more inner layers effective to strengthen the wall and defining channels for flow of a coolant from within the airfoil to the outer portion, the said channels being tapered toward the base and the structure between the channels being tapered away from the base so that the blade strength increases toward the base.

2. A blade as recited in claim 1 including bridges across said channels to strengthen the said inner layer in the chordwise direction.

3. A blade as recited in claim 1 in which channels extend entirely through one inner layer and channels extend only partially through another inner layer.

4. A blade as recited in claim 3 in which channels in both said inner layers are in sections separated by narrow bridges of full layer thickness.

References Cited

UNITED STATES PATENTS

| | | | |
|---|---|---|---|
| 2,851,216 | 9/1958 | Scanlan et al. | 253—77(P.O.)X |
| 3,011,761 | 12/1961 | Conway et al. | 253—39.15(B) |
| 3,057,597 | 10/1962 | Meyer et al. | 253—39.15(B) |
| 3,067,982 | 12/1962 | Wheeler | 253—39.15(B)X |
| 3,224,194 | 12/1965 | DeFeo et al. | 253—39.15(B)UX |
| 3,402,914 | 9/1968 | Kump et al. | 253—39.15(B) |

SAMUEL FEINBERG, Primary Examiner

U.S. Cl. X.R.

416—95, 229